United States Patent [19]

Ertel et al.

[11] Patent Number: 5,649,100
[45] Date of Patent: Jul. 15, 1997

[54] NETWORK BACKPLANE INTERFACE HAVING A NETWORK MANAGEMENT SECTION FOR MANAGING AND CONFIGURING NETWORKS ON THE BACKPLANE BASED UPON ATTRIBUTES ESTABLISHED IN A PARAMETER TABLE

[75] Inventors: Thomas F. Ertel, Westboro; David B. Aronoff, Lexington; Steven L. Gardner, Worcester; Ronald M. Parker, Acton, all of Mass.; Dean A. Warren, New Boston, N.H.; Edward S. Baxter, Cherry Valley, Mass.

[73] Assignee: 3Com Corporation, Santa Clara, Calif.

[21] Appl. No.: 296,028

[22] Filed: Aug. 25, 1994

[51] Int. Cl.$^6$ ................................................. G06F 13/00
[52] U.S. Cl. ........................ 395/200.1; 395/200.02; 395/200.2; 395/309; 395/882; 370/252
[58] Field of Search ............................. 395/200.02, 873, 395/877, 882, 200.1, 200.2, 309; 380/3; 370/13, 17

[56] References Cited

U.S. PATENT DOCUMENTS

| | | | |
|---|---|---|---|
| 4,972,470 | 11/1990 | Farago | 380/3 |
| 5,003,463 | 3/1991 | Coyle et al. | 364/200 |
| 5,058,110 | 10/1991 | Beach et al. | 370/85.6 |
| 5,287,343 | 2/1994 | Nakamura et al. | 370/13.1 |
| 5,293,487 | 3/1994 | Russo et al. | 395/200 |
| 5,305,317 | 4/1994 | Szczepanek | 370/85.5 |
| 5,388,109 | 2/1995 | Hodge et al. | 371/53 |

*Primary Examiner*—Thomas C. Lee
*Assistant Examiner*—Po C. Huang
*Attorney, Agent, or Firm*—McGlew and Tuttle

[57] ABSTRACT

According to the invention an intelligent network backplane interface is provided for an intelligent local area network hub and a method for implementing the common interface is provided. The hub includes a concentrator backplane operating one or more local area access method. Modules are provided for connection to said backplane for providing a local area network function. A common interface, in the form of a carrier unit having an interface management processor is provided for establishing a connection between any one of various modules and the backplane. The processor provides a control for exchanging information between a module and the common interface with a first mailbox for reading information signals from the module and writing information signals to the interface and a second mailbox for reading information from the interface and writing information to the module. Information acquired by the control is used to form a parameter table for listing features of the module. The features are received as information signals. The features are used by the intelligent hub for determining management of the module for connection of said module to said backplane. In this can the designer of the module does not limit its design to a specific concentrator for backplane and a module can be used with any backplane based on the common interface.

16 Claims, 7 Drawing Sheets

Fig. 5e

| Module Description | Model Number | Model Num Ext | Software Version | Mod Cap | Op Stat | Adm Stat | NCP | NSP | IP Default Gateway |
|---|---|---|---|---|---|---|---|---|---|
| 2 3 4 ... 17 | 18 19 ... 34 | 35 | 41 42 ... 45 | 46 47 | 48 | 49 | 50 | 51 | 52 ... 55 |

Fig. 5f

| Complex Port 1 Information | Complex Port 2 Information | Complex Port m Information |
|---|---|---|
| 52 53 54 ... 71 | 72 73 74 ... 91 | n, n+1 ... (n+19) |

Fig. 5g

| Port Cap | Op Stat | Adm Stat | Typ | Con | Spd | MAC Address | IP Address | IP Subnet Mask |
|---|---|---|---|---|---|---|---|---|
| 0 | 1 | 2 | 3 | 4 | 5 | 6 7 ... 11 | 12 .. 15 | 16 ... 19 |

NETWORK BACKPLANE INTERFACE HAVING A NETWORK MANAGEMENT SECTION FOR MANAGING AND CONFIGURING NETWORKS ON THE BACKPLANE BASED UPON ATTRIBUTES ESTABLISHED IN A PARAMETER TABLE

FIELD OF THE INVENTION

The invention relates generally to local area network (LAN) concentrators or hubs including concentrators and hubs dedicated to a particular LAN and especially LAN hubs having a backplane dedicated to more than one network (such as a concentrator with an ETHERNET network access method, and with another ETHERNET network access method or a token ring access method). Even more particularly, the invention relates to a LAN hub having a backplane which is configurable to one or more access methods, wherein various different modules can be connected to the backplane, in a controlled manner for media access, control, bridging and routing etc.

BACKGROUND OF THE INVENTION

Various systems for local area networks (LANs) are known from the prior art. These include intelligent hubs or concentrators with management for controlling connections to the concentrator backplane, configuring the backplane to one or more LAN access method and controlling operations of connected modules (such as port switching between LANs)

The concept of the "backplane bus" is well established in the computer and communications field; examples of standardized and proprietary backplane buses abound. In the most general terms, a backplane bus is a wiring center common to a single platform and shared by a number of users (generally implemented as printed circuit boards plugged into the bus via connectors).

The backplane bus is generally used for communications between the users according to some common LAN access method. The access method, data format and data rate, are all often common to all users of the bus. Often, the actual signaling on the hub's backplane is proprietary to the hub vendor and therefore interface circuits are required for translation from the standardized protocols. Also, most concentrator backplanes contain multiple networks that require switching circuits, controlled via hub network management means, to select which network the user is connected to. Concentrators also exist operating one or more of various different access methods. Specifically in LAN applications of backplane buses, there are two well established access methods: Carrier Sense, Multiple Access with Collision Detection (CSMA/CD) (ETHERNET) and Token Passing. Token Passing further distinguishes to a physical ring and physical bus manifestation. All of these access methods are used with multiple data rates and data formats, generating numerous protocols; in addition, there are other protocols which combine elements of both CSMA/CD and Token Passing, as well as protocols which use only some elements of the access methods (e.g. Carrier Sense, Multiple Access without Collision Detection).

The increased flexibility provided by hubs with backplanes which allow for more than one network to be running simultaneously, has resulted in various different products becoming available including media modules or media cards (media processing engine cards) which connect to the backplane of a hub wherein the media modules may include a specific media type running a specific media access method.

Other products include bridges routers, remote access devices, modem/terminal servers management modules and other similar cards or modules (processing engines). The modules are often switchable back and forth between the one or more networks, running on the backplane.

It is desirable to provide one processing engine module (media module, bridge, router, management module, etc.) which is usable on various different platforms. The designer of the processing engine must become aware of complex hub backplane interfaces as well as management protocols and other various protocols, provided for with regard to the specific hub. This has proven to be a significant problem with regard to new module development. There is a need to design modules for each specific hub, thereby limiting the possible uses for the designed modules.

SUMMARY AND OBJECTS OF THE INVENTION

It is an object of the invention to provide a system and method for connection of LAN modules to a backplane wherein the control of connections to the backplane is based on information transferred from the module to an intelligent backplane interface through a separate/simple management interface.

It is another object of the invention to provide hardware and software to be used to form an intelligent hub interface to allow designers of a processing engine module (PEM), such as media modules bridges, and routers to develop one product that automatically can be used in various different hubs.

It is a further object of the invention to provide hardware and software which allows a module designer to develop a single product independently, without coordination with a network hub developer, which product automatically works in multiple hub platforms, the hardware presenting a standardized hardware interface to module designers that defines a simple signaling method for a transparent interface to the network hub backplane. The hardware interface is capable of supporting a plurality of connections into a hub (such as four or more). A group of network connections may be, for example, for either ETHERNET (IEEE 802.3) or token ring (IEEE 802.5) media access/media types.

Still another object of the invention is to provide a software interface for flexible standardized management of any product (including a product designed by other than the network hub designer), by a hub manager (either designed by the hub designer or another designer). The software interface is based on a generic software protocol which is made available to organizations wherein the software protocol is used to automatically determine the identity and extent of manageable characteristics of the PEM. The intelligent network interface uses this information to automatically link the PEM native management functions to the hubs management agent. Through this software interface and the method of using such software and hardware interface, the PEM is automatically manageable through a common environment provided by the hubs manager via Telnet, SNMP, and terminal access.

It is a further object of the invention to provide an open hub environment based on a unique hardware/software common interface based on IEEE 802.3 and 802.5 for media signals, and the mailbox and SW protocol for PEM to Hub\concentrator communications/control; allows independent parties to design cards based on their products with the "common interface" which will be capable of working in several hubs via connection with appropriate carrier modules. Together, the third party product plugged into a carrier creates a single hub module.

This invention provides a unique means that allows module designers to develop products quicker (by not having to become aware of backplane switching and interface circuits) and which are not limited to a single, particular backplane. This is accomplished by providing a common interface, one for Token Ring and one for Ethernet, that includes a common, simple management interface (mailbox protocol). The various hub vendors can then provide Carrier Modules to PEM vendors that provides all of the hub specific circuits and software required to connect to that platform. PEM vendors can then leverage one design across multiple platforms from a single vendor or multiple vendors.

The invention provides a hub with an intelligent hub interface or carrier which is associated with a hub of a particular design. A PEM is provided designed based on a specific protocol. The carrier is provided with a mailbox and the PEM is also provided with a mailbox. In this way, a simple protocol is implemented wherein the carrier writes to the PEM mailbox and reads from the carrier mailbox and the PEM reads from the PEM mailbox and writes to the carrier mailbox. The PEM central processing unit (CPU) transfers data to a management processor (MPU) of the carrier. The data is stored to memory. This builds up a personality table (by storing data to memory) by the processor (MPU) which is provided on the carrier. The personality (or parameter) table is built up based on information received from the PEM wherein a table of attributes or personality information is established. The personality information includes the product itself and a list of what is manageable as to the PEM product. This mechanism allows a single software means for the carrier module that is capable of learning what PEM is plugged into it, the PEM's media type, number of backplane ports, number of front panel ports, etc., and what features/ functions are manageable via the hub's network management means.

For example, at power up an echo command is generated ordering the PEM to write to the carrier mailbox and the carrier echoes back a response. Subsequently, information is exchanged whereby the carrier builds up a personality (or parameter) table (P-table), based on information contained within the personality information of the PEM. For example, this can be used to note that nothing on the PEM is manageable (by the hub management). On the other hand, it can be noted that the PEM can be managed by the hub management as to ports, port speed and other features which may be managed by the hub management entity.

The carrier module system is based on a specific hub backplane, for example the concentrator configuration and backplane described in U.S. Pat. No. 5,301,303, which is hereby incorporated by reference.

The hub or concentrator includes a network Management Module (nMM) to provide an intelligent hub. The network Management Module provides SNMP, Telnet and direct console management of the hub and each installed module. The management comprises status and configuration control. In addition, the network Management Module configures certain physical aspects of the hub and its modules, including such items as network attachment, LAN speed, port enable/disable. To implement the management, the management module implements a concentrator management protocol which is either specific to a single intelligent hub or is common to several different intelligent hubs. A Management Processing Unit (MPU) is provided which implements specific management functions of the intelligent hub.

According to the invention an intelligent network backplane interface is provided for an intelligent local area network hub. The hub comprises a concentrator backplane operating one or more network with one or more local area access method. Modules are provided for connection to said backplane for providing a local area network function. Interface means, in the form of a carrier unit having an interface management processor are provided for establishing a connection between the PEM (or 3rd party, Independent party) module and the backplane. The processor provides control means for exchanging information between the modules. A first mailbox is provided for reading information signals from the independent party module and writing information signals to the carrier said interface means and a second mailbox for reading information from said interface means of the independent module and writing information to said mailbox. Information acquired by the control means is used to form a parameter table means for listing features of the module. The features are received as information signals. The features are used by the intelligent hub for determining management of said module for connection of said module to said backplane.

The invention further provides a method for establishing a connection between a local area network backplane including vendor proprietary signaling means (many hub products are close to but do not exactly meet the IEEE 802.3; 802.5 standard) and a module using standard complaint media, the module having a module central processing unit and the backplane having an interface with a management processing unit, a management processing unit mailbox and a module processing unit mailbox and having a management processing unit mailbox flag and a module processing unit mailbox flag, the method comprising initializing communication between said management processing unit and said module central processing unit. Information is transferred to the management processing unit, is stored to memory and is then used by a network management unit associated with the hub to control connections of the module to the backplane, to control the module and to report module identity and status.

The communication between the intelligent interface and the module includes:

(1) checking an associated mailbox to determine if the mailbox is empty;

(2) placing a next data unit octet into said mailbox and setting the flag;

(3) repeating steps 1 and 2 until all data unit octets have been transmitted.

Reception comprises the steps of:

(1) checking a mailbox associated with the processing unit to which the transmission is to be sent to determine if it is full or empty;

(2) reading the next data unit octet from the mailbox (inbox) if the next octet is a first octet of a data unit, the octet is used as a length indication; and (3) repeating steps 1 and 2 until all data unit octets have been received.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 5E is a representation of the structure of the coding of module information;

FIG. 5F is a representation of the structure of personality tables showing a number of complex ports;

FIG. 5G is a representation of the structure of the coding of complex port information.

DETAILED DESCRIPTION OF THE PREFERRED EMBODIMENT

Figure 1:
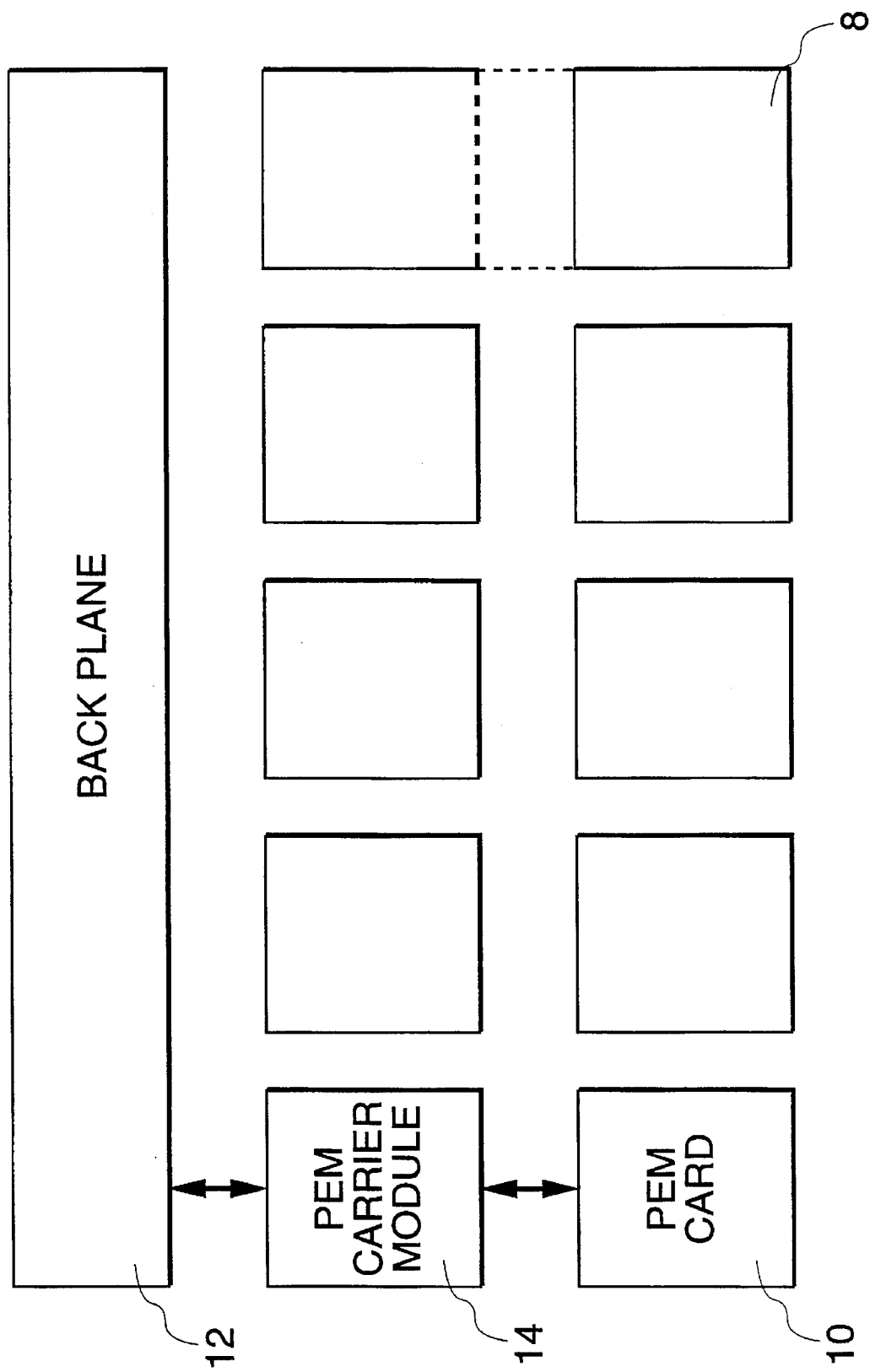
FIG. 1 is a schematic view showing the connection of the PEM Carrier Module to the backplane and the connection of a PEM card to the PEM Carrier Module.

Referring to the drawings in particular, the invention comprises an interface between a PEM card 10 and a specific backplane 12. The backplane may be a backplane designed specifically for a particular LAN network access method, such as a single ETHERNET network, a single token ring network, a single FDDI network etc. The backplane 12 may also be a specific backplane including more than one channel for grouping of circuits wherein each channel or grouping of circuits is dedicated to a network access method. With this type of backplane, two different networks may be operating simultaneously based on a specific, defined network access method (two ETHERNET networks, an ETHERNET network and a token ring network etc.). Further, the backplane 12 may be a generic backplane, configurable to or one or more of numerous LAN network access methods.

The backplane 12 may be part of an intelligent hub or concentrator. A network management means (NMM) 8 may be connected to the backplane for configuring the backplane to one or more networks, each running any one of several known network access methods. The NMM 8 also controls enabling of ports of connected modules such as PEM card 10 and controls connection of modules to the backplane such as carrier module 14 and also controls the modules themselves.

The PEM card 10 may be any one of numerous types of modules. For example, PEM card 10 may be a media module or media distribution card, namely for connection to the backplane of a specific media type (twisted pair, coaxial cable, fiber optic cable etc.) running a specific network access method (ETHERNET, token ring, FDDI, token bus etc.). The PEM card could also be a local area network management module NMM (for managing the network, configuring a generic backplane etc.). That is, the NMM may also be connected to the backplane via an intelligent interface as described herein. The PEM card could be other entities such as a bridge, router remote access device and modem terminal server or the like. The main feature of the invention is that the PEM card could be a yet to be designed card wherein the designer of the PEM card does not need to know the specifics as to the backplane connections, management and interface to the backplane. Furthermore, one PEM card can be used to connect a variety of backplanes/concentrators via mating with different modules.

Figure 2:
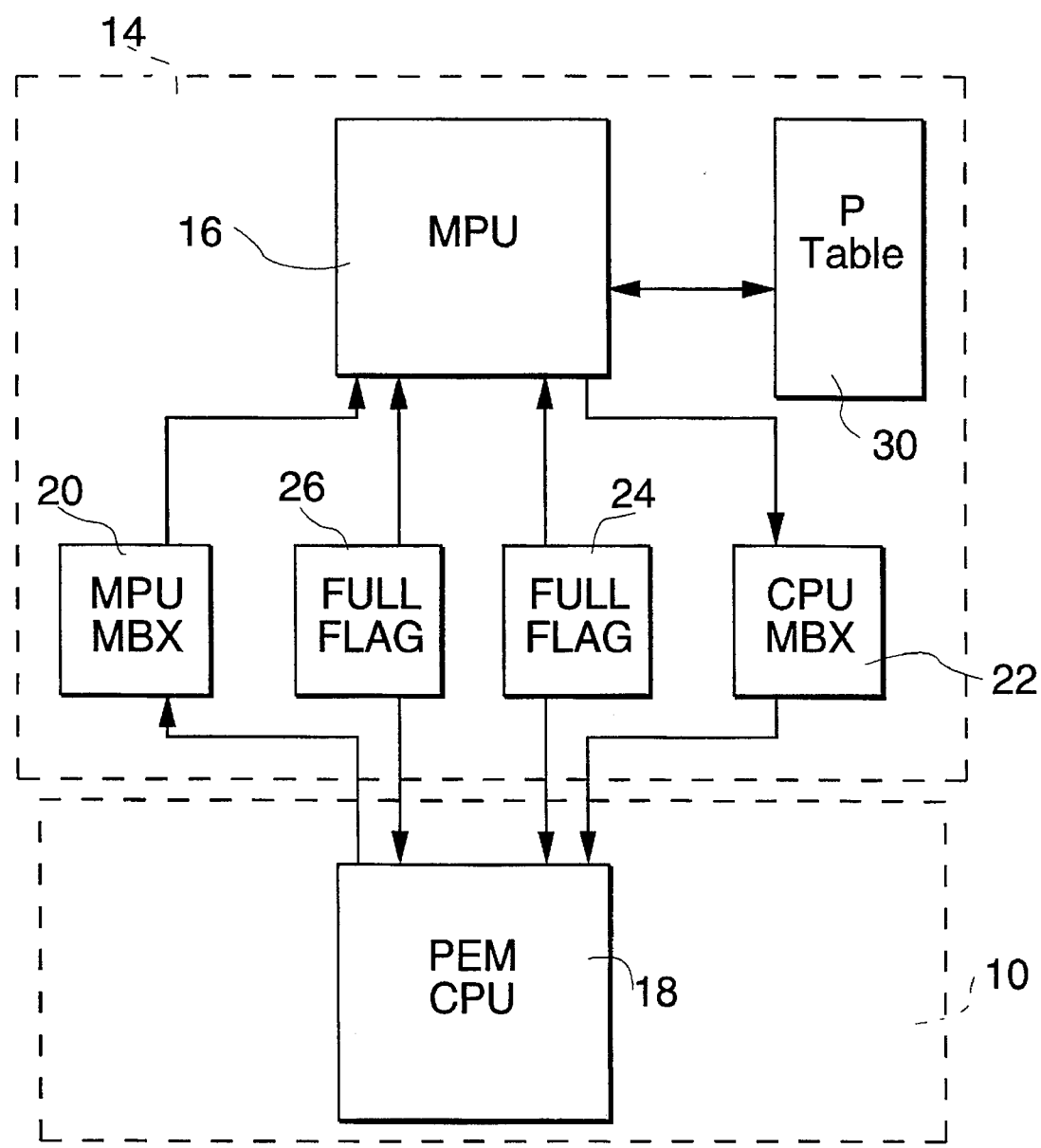
FIG. 2 is a schematic view showing the hardware interface and mailbox protocol for exchange of information between the MPU of the carrier module and the CPU of a PEM card.

The connection of the PEM card to the backplane is made via a PEM Carrier Module 14. The carrier module 14 provides an intelligent interface between a specific backplane and the standardized PEM interface to a connected module. The physical management interaction between the PEM card 10, the PEM Carrier Module 14 is shown in FIG. 2. FIG. 2 provides schematic view showing the hardware interface between the MPU 16 and PEM CPU 18 LAN data/traffic has a separate path that goes directly from the PEM's media port to the Carrier's backplane interface circuits (for signal conditioning and switching) via the PEM connector. The PEM Carrier Module includes a local management processor or MPU 16. The PEM card 10 includes a processor implementing the native partner functionality (functionality defined by PEM designer), namely PEM CPU 18.

The hardware interface employs a MPU mailbox (MPUMBX) 22 which is an eight bit register defined as MPU 16 read only and CPU 18 write only. A CPU mailbox (CPUMBX) 22 is provided in the form of an eight bit register defined as CPU 18 read only, MPU 16 write only. The MPUMBX 20 thereby provides an in-box for the MPU 16 and an out-box for the PEM 18 whereas the CPUMBX 22 provides an in-box for the MPU and an out-box for CPU 18. CPUMBX full 24 is a flag indicating that the CPU mailbox 20 is full. MPU MBX full 26 is a flag indicating that the MPU mailbox 20 is full. The flag 24 can be set only by the MPU 16 by the MPU 16 writing of CPUMBX 22 and can be reset (cleared) only by the CPU 18 reading CPUMBX 22. Likewise the flag 26 can be set only by the CPU 18 writing CPUMBX 20 and can be reset (cleared) by the MPU 16 reading CPUMBX 20. With this action of the CPU 18, the flag becomes automatically set, and, if desired interrupts the MPU 16. When the MPUMBX is read by the MPU 16, this flag is automatically cleared.

A specific software interface using the above described mailbox protocol, is provided according to the invention for communications between the PEM CPU 18 and the MPU 16 (between the PEM card 10 and the PEM Carrier Module 14).

At the lowest level, the mailbox software interface comprises a processor (the transmitter) placing an octet in the other processors (the receiver) in-box (MPU MBX 20 or CPU MBX 22), thereby setting the receivers in-box full flag (24, 26). The receiver detects the data arrival (either by polling the receiver full flag or receiving an interrupt indicating the condition). The receiver, upon reading its in-box, clears the in-box full flag.

The software interface relies on the mailbox protocol data unit (MPDU) which is a sequence of octets transferred between a transmitter and a receiver. MPDUs are exchanged bi-directionally between the PEM CPU 18 and the MPU 16 (both processors can act as transmitter and receiver).

MPDU transmission includes the following steps: (1) checking the out-box (MPU MBX 20 or CPU MBX 22) to make sure it is empty; (2) placing the next MPDU octet into the out-box and setting the flag (full 24, 26); and (3) repeating steps one and two until the MPDU octets have been transmitted. The first octet of each MPDU is preferably a length indicator.

MPDU reception includes the following steps: (1) checking the in-box (MPU MBX 20 or CPU MBX 22) to make sure it is full; (2) reading the next MPDU octet from the in-box. If this is the first octet of MPDU, using the first octet as a length indicator; and (3) repeating steps one and two until all MPDU octets have been received.

The software interface preferably provides for a time out (the length of time may vary between the implementations), utilized between transmission/reception of successive MPDU octets. During transmission, the receiver must read its in-box (20, 22) and clear its in-box full flag (24, 26) within a time period from the date of arrival, or the transmitter will generate a time out. In reception, the transmitter must place a new octet of data in its out-box within a time period after the receiver clears its in-box, or the receiver will generate a time out period.

Upon detection of a timeout the error must be propagated up to the higher layer as a protocol timeout error.

The mailbox hardware provides full duplex data transmission capability, i.e. both the PEM CPU 18 and the MPU 16 may transmit and receive simultaneously. Software designers must include sufficient buffer space to support simultaneous receive and transmit of the largest MPDU.

Parameters passed across the mailbox interface include static and dynamic information regarding diagnostic testing of the interface, module and port personality information, module and port status information, and module and port control parameters. The parameters are not intended to replace local console, Telnet or SNMP management, but instead are used to augment concentrator management (NMM) capabilities. The parameters provide descriptive information about the inserted module and sustain the base level of control the concentrator management hold for all integrated products.

MPDUs provide the transport mechanism between the PEM CPU and the carrier MPU. MPDUs include: Echo Request, Echo Response, Personality Notification, Operational Status Notification, Administrative State Notification, Network Configuration Notification, Speed Configuration Notification, IP Configuration Notification, MAC Configuration Notification, Remote Command Request, Remote Command Response and Date-Time Notification.

As specified by the mailbox protocol, some of these MPDUs are bi-directional, able to be transmitted by both the PEM CPU 18 and the MPU 16, while others are uni-directional.

To support a flexible protocol, the notion of capabilities is introduced. Capabilities indicate the options the PEM CPU 18 will support within the mailbox protocol. During the initialization of the mailbox protocol, the PEM CPU transfers a Personality Notification MPDU—which among other items includes supported capability parameters. Inclusion and exclusion of capabilities is the method used to vary the level of PEM integration.

Capabilities are provided on a module and per-port basis. If the PEM CPU 18 supports a given defined option, then it must set the appropriate bit location in the capabilities parameter. If a given option is not supported, the PEM CPU must clear the bit location to indicate exclusion of the capability. For example, if the Port Enable/Disable Support bit location is clear in the module capabilities parameter, MPU 16 will never send the PEM CPU port enable/disable MPDUs.

Since capabilities indicate supported protocol options, their inclusion and exclusion have a direct effect upon both the mailbox protocol initialization sequence and normal mailbox MPDU exchanges.

Ports on modules are placed into one of two categories—simple and complex ports. A simple port reports only basic information such as port type and speed, and may be enabled or disabled. Media ports (e.g. terminal server or WAN ports) are generally considered "simple".

A complex port is one that possesses complex attributes in addition to those of the simple port. These attributes include MAC Address, IP Address, and port-to-network switching. Generally ports connected to the backplane interface circuity (carrier interface circuity via PEM connector) are complex ports.

This specification for mailbox interactions is intended to cover a wide range of product offerings, developed with differing levels of required management integration. In some cases tightly coupled integration may be in order, where the full capabilities of the protocol will be utilized. In other cases, management integration will be less of a concern, and only the minimal set of capabilities will be supported by the partner CPU 18. The MPU 16 software is able to automatically adjust to the level of integration desired by the PEM CPU 18.

The mailbox protocol is intended to be a simple protocol that intrudes upon the PEM CPU as little as possible. To accomplish this goal the protocol consists of only one mandatory sequence of events—initialization. All operational exchanges within the mailbox protocol are optional, based upon the capabilities supported by the PEM CPU.

Figure 3:
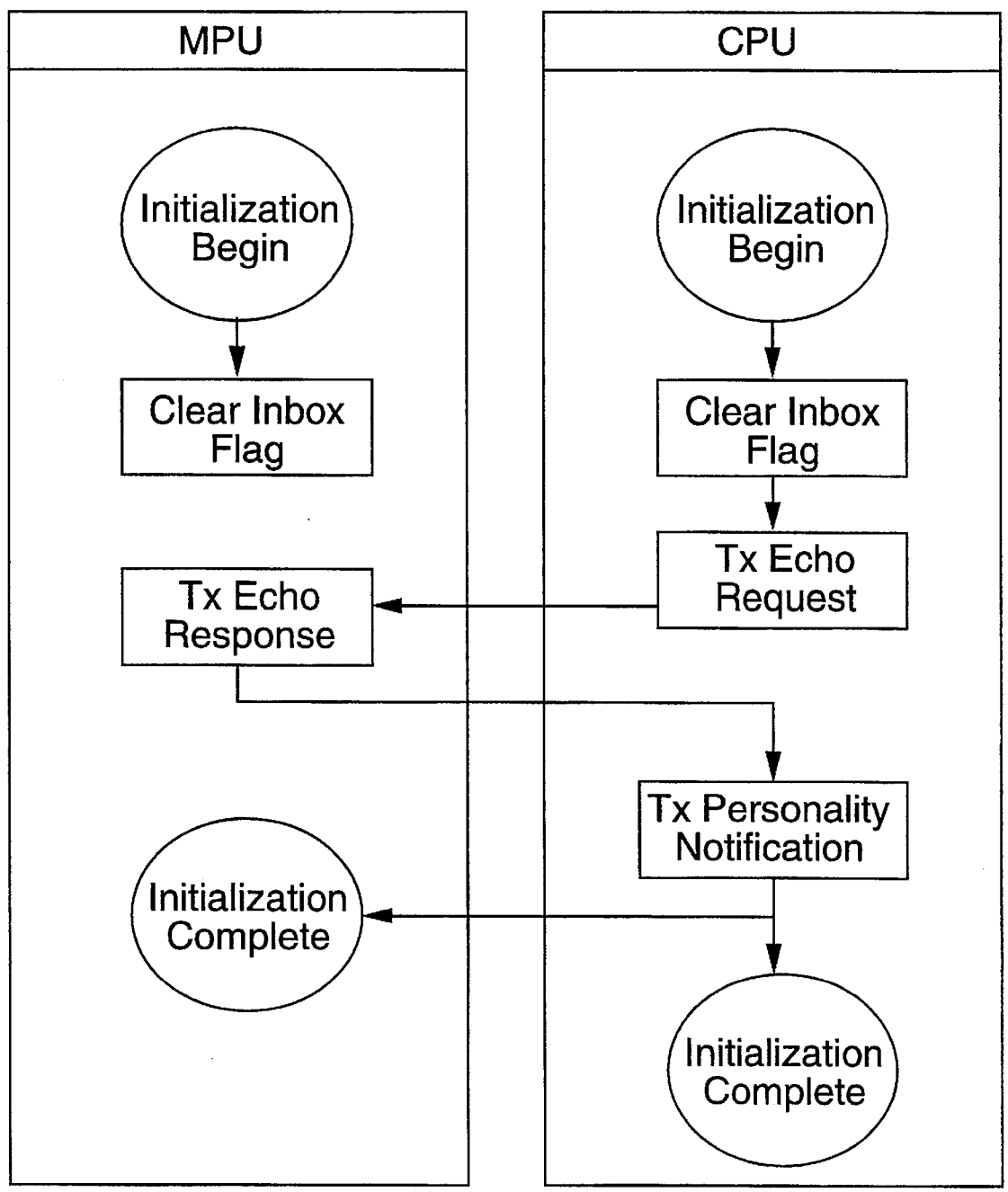
FIG. 3 is a flow chart showing a mailbox protocol initiation sequence according to the invention.

The mailbox protocol initialization sequence consists of two mandatory steps, as represented in FIG. 3, in which:

1. the PEM CPU 18 and the MPU 16 determine the health of the mailbox hardware by exchanging Echo messages;

2. the PEM CPU 18 transmits its Personality information to the MPU 16. This allows a personality table or P-table to be built up.

Upon completion of these steps, the mailbox protocol is initialized. The MPU then examines the personality information (P-table) and determines which operational capabilities, if any, the PEM CPU 18 will support and notifies the NMM 8 of the identity and capabilities of the PEM card. If the CPU 18 indicates no support for any capabilities, there will be no further mailbox communication.

All MPU 16 initialization actions are mandatory. The following state table (TABLE I) applies to the MPU 16 during its initialization sequence (note that the initial state is Asleep).

TABLE I

| | State | |
|---|---|---|
| Event | Asleep | Personality Info Pending |
| Rx Echo Request MPDU | Validate Echo data: The received data must be 0 × 55AA. If the data is invalid, the MPU will generate an error condition. If the data is valid, the MPU will generate an Echo Response MPDU. Next State = Personality Info Pending | Error Condition. |
| Rx Personality Notification MPDU | Error Condition. | Accept information and build database. Next State = See MPU Operational State Table |
| PP Timeout Rx undefined Ev | N/A | Error condition. |

All CPU 18 initialization actions are mandatory if mailbox is not hardwired dead (inactive). If mailbox is hardwired dead (inactive), no initialization sequence occurs. The following state table (TABLE II) applies to the CPU 18 during its initialization sequence (note that the initial state is Asleep).

mailbox prior to needing access to backplane network interfaces.

During mailbox protocol initialization the MPU expects that the CPU will issue its Personality notification within 5 seconds (or other time interval depending upon the

TABLE II

| | State | |
|---|---|---|
| Event | Asleep | Personality Info Pending |
| Ready to begin mailbox initialization | Generate Echo request The Echo data must be 0 × 55AA. Next State = Echo Response Pending (ERP) | Error Condition |
| Rx Echo Response MPDU | Error Condition. | Validate Echo data: The received data must be 0 ×AA55. If the data is invalid, the CPU will generate an error condition. If the data is valid, the MPU wt generate an Personality Notification MPDU. Next State See CPU Operational State Table |
| ERP Timeout RX undefined Ev | N/A | Error condition. |

Commencement of mailbox initialization is in control of the PEM CPU 18. The MPU 16 completes its internal diagnostics and then waits for the PEM CPU 18 to issue an Echo request. During this time the MPU has configured all backplane network interfaces to an isolated state, i.e. no access is provided to backplane networks. After successful completion of mailbox initialization the MPU will assign the backplane network interfaces and notify the PEM CPU 18. This implies that the PEM CPU 18 must initialize the implementation) after the MPU transmitted the MPU Echo response. If a timeout occurs, the MPU will indicate an error condition.

All operational actions with the mailbox protocol are options, based upon capability support with the PEM CPU 18. If no capabilities are supported by the PEM CPU 18, no operational interactions will be expected by the MPU 16. TABLE III presents a MPU operational state table and TABLE IV presents the CPU operational state table according to the preferred embodiment.

TABLE III

MPU Operational State Table

| Event | State<br>Configured |
|---|---|
| Rx Echo Request MPDU<br>(manitory during initialization)<br>(optional during normal operation) | Validate<br>If Capability is supported the MPU generates and Echo response MPDU.<br>If Capability is not supported the MPU will generate an error condition. |
| Rx Echo Response MPDU<br>(mandatory during initialization)<br>(optional during normal operation) | Validate<br>If Capability is supported, there is an outstanding Echo Request, and the received data is the 1's complement of the outstanding Echo request data then the Echo Pending Timer is cancelled.<br>If Capability is not supported the MPU will generate an error condition.<br>If no Echo request is outstanding the MPU will generate an error condition.<br>If the data is invalid, the MPU will generate an error condition. |
| Rx Personality Notification MPDU | Error Condition (or, following? TBD:)<br>Validate<br>Check for ? . . .<br>if __? update local database |
| Rx Operational Status MPDU<br>Rx Administrative State MPDU<br>Rx Speed Configuration MPDU<br>Rx 1P Configuration MPDU | Validate<br>If Capability is supported the MPU updates its database. |
| Rx MAC Configuration MPDU<br>Rx Remote Command Result MPDU<br>(unsolicited) | If Capability is not supported the MPU will generate an error condition. |
| Change in Administrative State<br>Change in Network Configuration<br>Change in Speed Configuration<br>Change in 1P Configuration<br>Change in MAC Configuration<br>Remote Command<br>Date/Time Service | Validate<br>If Capability is supported the MPU generates the appropriate MPDU. |
| Heartbeat Timer Expired | Validate<br>If Capability is supported the MPU generates an Echo request and starts the Echo Pending Timer. |
| Echo Pending Timeout<br>Rx undefined Ev | Generate error condition |

40

TABLE IV

CPU Operational State Table

| Event | State<br>Configured |
|---|---|
| Rx Echo Request MPDU<br>(operational during normal operation) | Validate<br>If Capability is supported the CPU generates and Echo response MPDU.<br>if Capability is not supported the CPU will generate an error condition. |
| Rx Echo Response MPDU<br>(mandatory during initialization)<br>(optional during normal operation) | Validate<br>If Capability is supported, there is an outstanding Echo Request, and the received data is the 1's complement of the outstanding Echo request data then the Echo Pending Timer is cancelled.<br>If Capability is not supported the CPU will generate error condition.<br>if no Echo request is outstanding the CPU will generate an error condition.<br>If the data is invalid, the CPU will generate an error condition. |
| Rx Administrative State MPDU<br>Rx Speed Configuration MPDU<br>Rx Network Configuration MPDU | Validate<br>If Capability is supported the CPU updates its database. |
| Rx 1P Configuration MPDU<br>Rx MAC Configuration MPDU | If Capability is not supported the CPU will generate an error condition. |

TABLE IV-continued

CPU Operational State Table

| Event | State Configured |
|---|---|
| Rx Remote Command Result MPDU (unsolicited) Change in Operational Status Change in Administrative State Change in Speed Configuration Change in 1P Configuration Change in MAC Configuration Remote Command Complete DateTime Service | Validate If Capability is supported the CPU generates the appropriate MPDU. |
| Heartbeat Timer Expired (optional) | Validate If Capability is supported the CPU generates an Echo request and starts the Echo Pending Timer. |
| Echo Pending Timeout Rx undefined Ev | Generate error condition |

Heartbeat checking (check timing) is provided automatically by the MPU 16 when the CPU 18 supports the heartbeat capability. Assuming support, the MPU 16 will generate a heartbeat check, i.e. Echo Request, every 5 seconds (or other time interval depending upon the implementation). The MPU 16 requires that the CPU 18 will issue its Echo response within 5 seconds after receiving the MPU Echo request. If a timeout occurs, the MPU 16 will indicate an error condition.

During normal operation, heartbeat checking by the CPU 18 is optional, and available only if the CPU 18 supports the heartbeat capability. The MPU 16 guarantees it will respond to the CPU 18 within 5 seconds (or other time interval depending upon the implementation) after receiving the CPU Echo request. Timeout handling is left as a local decision to the CPU/MPU 18/16 software designer.

There are no timing constraints placed on responses to Remote command requests by the MPU.

Figure 4A:
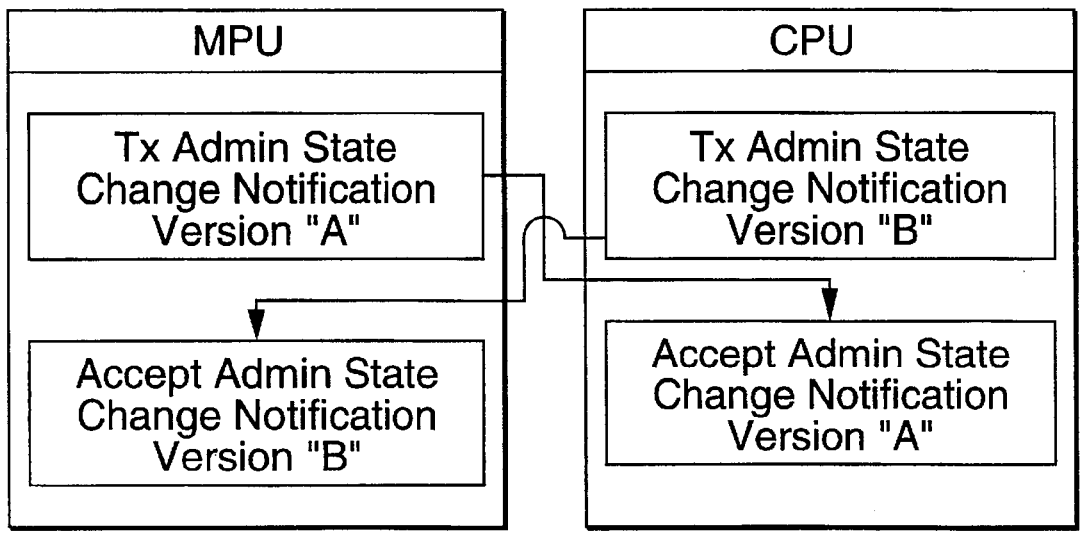
FIG. 4A is a diagram showing an example wherein the CPU and MPU send each other administrative state change notification data units simultaneously.
Figure 4B:
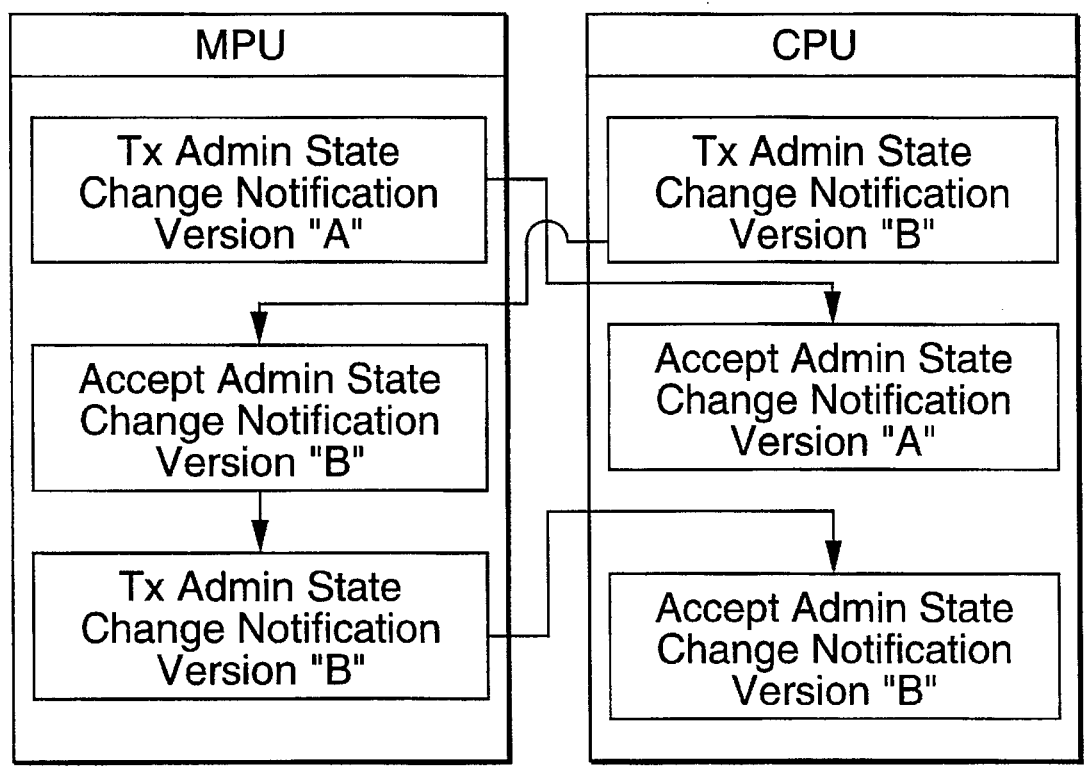
FIG. 4B is a diagram showing how the MPU enforces coherency.

Since the low level mailbox interface can receive and transmit MPDUs simultaneously, there is potential for loss of database coherency between the PEM CPU and the backplane (hub) MPU. This condition occurs when the CPU transmits a MPDU, and then receives the a MPDU of the same type from the MPU 16. The general rule in this situation is that the PEM CPU 18 transfer takes precedence over the MPU 16 transfer information. To alleviate the need for the PEM CPU 18 to detect the simultaneous change occurrence, the MPU 16 is responsible for database reconciliation. As an example, consider the situation illustrated in FIG. 4A where the CPU and MPU send each other Administrative State Change Notification MPDUs. In this case the MPU 16 and CPU 18 would have inconsistent views of the administrative state information. Note that this condition is possible for all MPDU types available to both the MPU 16 and CPU 18. To prevent this situation from occurring, the MPU 16 is responsible for enforcing coherency. So, in the previous example the steps as shown in FIG. 4B are taken. This results in the desired state.

Each MPDU includes a simple one octet checksum. Upon reception of a MPDU, the MPU 16 recalculates the checksum and compares in to the value received from the CPU 18.

All Mailbox Protocol Data Units (MPDUs) contain an integral number of octets. The number of octets in a MPDU are numbered starting from zero. The bits in an octet are numbered from 0 to 7, where 0 is the low order bit.

MPDUs shall contain, in the following order:

a) the header, comprising:
  1) the length indicator field (LI), which is the length of the data field; and
  2) the MPDU code field (MC);
b) the data field, if present,
c) the trailer, comprising the checksum field (CK).

Figure 5A:
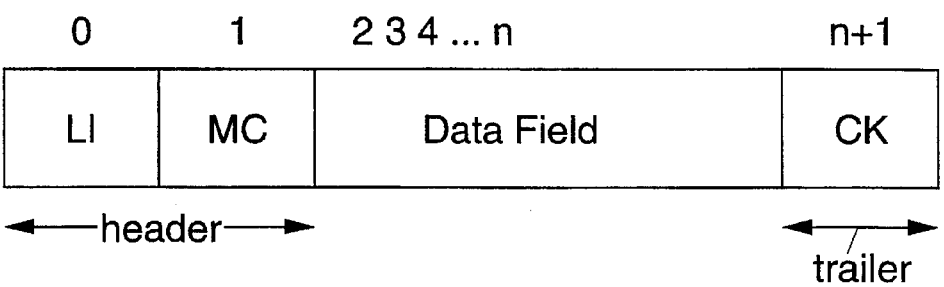
FIG. 5A is a representation of the structure of a mailbox protocol data unit (MPDU)

This structure is illustrated in FIG. 5A. This field is contained in the first octet of the MPDU. The length is indicated by a binary number, with a maximum value of 254 (1111 1110). The length indicated is the length of the Data Field. The value 255 (1111 1111) is reserved for future use. This field contains the MPDU code. It is used to define the structure of the data field. This field contains transparent user data. Restrictions on encoding and size are noted for each MPDU. All MPDU types include an 8 bit checksum parameter encoded in the last octet of the message. The checksum is constructed as the module 255 sum of all preceding octets of the MPDU.

During initialization, and if implemented during normal operation, the MPU 16 or CPU 18 must accept this and respond with a properly encoded Echo Response MPDU any time the other partner issues this request.

Figure 5B:
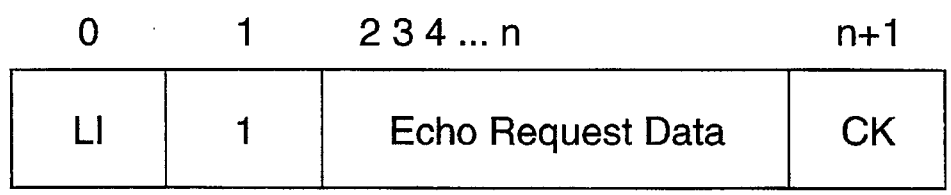
FIG. 5B is a representation of the structure of an echo request MPDU.
Figure 5C:
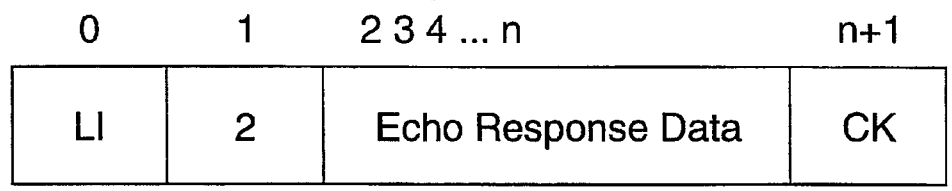
FIG. 5C is a representation of the structure of an echo response MPDU.

The structure of the Echo Request MPDU is as shown in FIG. 5B. During initialization, the content of the Echo Request Data is 0×55AA. At times other than initialization, Echo Request Data are encoded as any data the user provides. Transmission of this message is mandatory only upon receipt of an Echo Request MPDU. The MPU or CPU must generate a properly encoded Echo Response MPDU any time the other partner issues an Echo Request. Proper handling of receipt of this message is mandatory during initialization, and optional during normal operation. The structure of the Echo Response MPDU is shown in FIG. 5C. Echo response data is encoded as the octet-by-octet 1's complement of the most recently received Echo request MPDU. During initialization, the content of the Echo Response Data is 0×AA55.

Figure 5D:
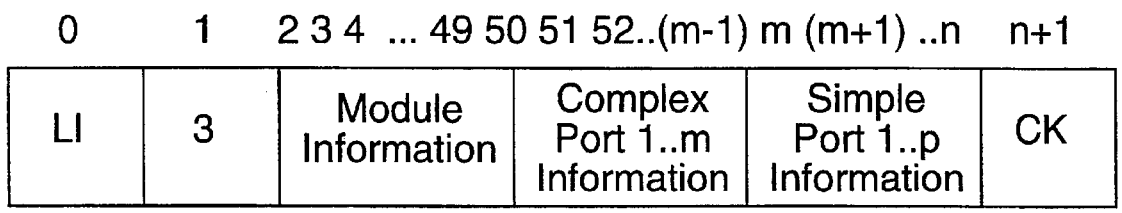
FIG. 5D is a representation of the structure of a personality notification MPDU.

Other MPDU's include personality notification MPDU's. The structure of Personality Notification MPDU is shown in FIG. 5D. Included is Module information of the structure shown in FIG. 5E. The module description field is (preferably) a 16 octet ASCII string (15 ASCII characters+1 NULL character) describing the module and its basic functions, e.g. "Enet Tstr Oven" (ETHERNET Toaster Oven). The hub manufacturer will supply this string to the PEM designer. The PEM designer should pad strings of less than 16 octets with NULL characters. The module number field is (preferably) a 16 octet ASCII string (15 ASCII characters+1 NULL character) describing the hub model number for the PEM product. The hub manufacturer will supply this string to the PEM designer. The PEM designer The defined values for the module capabilities are shown in TABLE V.

TABLE V

| Bit | Capability | |
|---|---|---|
| 0 | =1 | Operational Status Change notification supported. PEM CPU will generate these messages. |
| | =0 | Operational Status Change notification not supported. |
| 1 | =1 | Administrative State Change notification supported. PEM CPU will generate and accept these messages. |
| | =0 | Administrative State Change notification not supported. |
| 2 | =1 | Network Configuration notification supported. PEM CPU win accept these messages. |
| | =0 | Network Configuration Change notification not supported. |
| 3 | =1 | Speed Configuration notification supported. PEM CPU will accept these messages |
| | =0 | Speed Configuration notification not supported. |
| 4 | =1 | Remote Command Execution supported. PEM CPU will accept messages and issue results. |
| | =0 | Remote Command Execution not supported. |
| 5 | =1 | MPU heartbeat check supported. PEM CPU will accept these messages and may generate these messages |
| | =0 | MPU heartbeat check not supported. |
| 6 | =1 | MAC configuration Change notification supported. PEM will issue/accept notification to change MAC address. |
| | =0 | MAC Configuration Change notification not supported. MAC Configuration is only appropriate for ports supporting locally administered MAC address. is assumed that in most cases this capability will not be supported. |
| 7 | =1 | IP Configuration notification supported. PEM will issue/accept notifications to change IP information. |
| | =0 | IP Configuration notification not supported. |
| 8 | =1 | IP Default Gateway notification supported. |
| | =0 | IP Default Gateway Change notification not supported. |
| 9 | =1 | Date/Time Change notification supported. |
| | =0 | Date/Time Change notification not supported. |
| 10 | RESERVED FOR FUTURE USE | |
| 11 | RESERVED FOR FUTURE USE | |
| 12 | RESERVED FOR FUTURE USE | |
| 13 | RESERVED FOR FUTURE USE | |
| 14 | RESERVED FOR FUTURE USE | |
| 15 | RESERVED FOR FUTURE USE | | should pad strings of less than 16 octets with NULL characters. The model number extension field is (preferably) a 8 octet ASCII string (7 ASCII characters+1 NULL character) describing the hub model number extension for the PEM product. The hub manufacturer will supply this string to the PEM designer. The PEM designer should pad strings of less than 8 octets with NULL characters.

The software version field is a 4 octet ASCII string describing the current software version number of code executing on the PEM CPU. This is preferably in a standard version number format:

TMmi where T is issue type, M is major revision number, m is minor revision number and i is incremental revision number. Valid issue types include, in chronological order of software development:

'D'—Development release
'X'—Experimental release
'A'—Alpha Test release
'B'—Beta Test release
'V'—Production release The Model capabilities field is a 2 octet field that indicates capabilities supported by the PEM CPU on a module-wide basis, i.e. it describes the Mailbox protocol primitives the PEM product will provide and accept during operation. It is encoded as a 16 bit mask field.

Similar defined values may be established for other fields. Fields used according to the preferred embodiment include: Module Operational Status (a 1 octet field that indicates the current operational status of the PEM product); Administrative State (a 1 octet field that indicates the current administrative state of the PEM product); Number of Complex Ports (a one octet indication of the total number of complex ports implemented by the PEM product); Number of Simple Ports (a one octet indication of the total number of simple ports implemented by the PEM product); Default Gateway (a 4 octet canonical representation of the lP default gateway of the module. If an lP default gateway is encoded with each octet set to zero, and the module capability for 1P Configuration is not supported, then it is assumed the module has no 1P default gateway. In this case the MPU will report no IP default gateway for this module. If an 1P default gateway is encoded with each octet set to zero, and the module capability for 1P Configuration is supported, it is assumed the IP default gateway is uninitialized. In this case the MPU will report the IP default gateway with each octet set to zero).

Information for each complex port implemented by the PEM is to be encoded sequentially, such that the complex port information field is structured as shown in FIG. 5F. Individual complex port information is encoded as shown in FIG. 5G.

Individual complex port information includes: port capabilities (a 1 octet field that indicates capabilities supported by the designated complex port of the PEM product, i.e. it describes the Mailbox protocol primitives the PEM product will provide and accept during operation. It is encoded as a 8 bit mask field); Port Operational Status (a 1 octet field that indicates the current operational status of the designated PEM port); Port Administrative State (a 1 octet field that indicates the current administrative state of the designated PEM port); Port Network Type (1 octet field that indicates network type of designated port); Port Connector Type (a 1 octet field that indicates connector type—RJ unshielded twisted pair etc.—of designated complex port); Port Network Speed (a 1 octet field that indicates the current speed of the port); Port MAC Address (a 6 octet canonical (ETHERNET style) representation of the MAC address of the port); 1P Address (a 4 octet canonical representation of the IP address of the port); and IP Subnet Mask (a 4 octet canonical representation of the IP subnet mask of the port).

Similar to complex ports, information for each simple port implemented by the PEM is to be encoded sequentially.

The carrier module must be implemented based on the proposed module type which is to be connected thereto. Specifically, the module must be designed for example as an interface with a media module or other similar device. Preferred forms of the carrier module are disclosed herein with regard to an ETHERNET interface and a token ring interface.

TOKEN RING AND ETHERNET CARRIER MODULE

Figure 6:
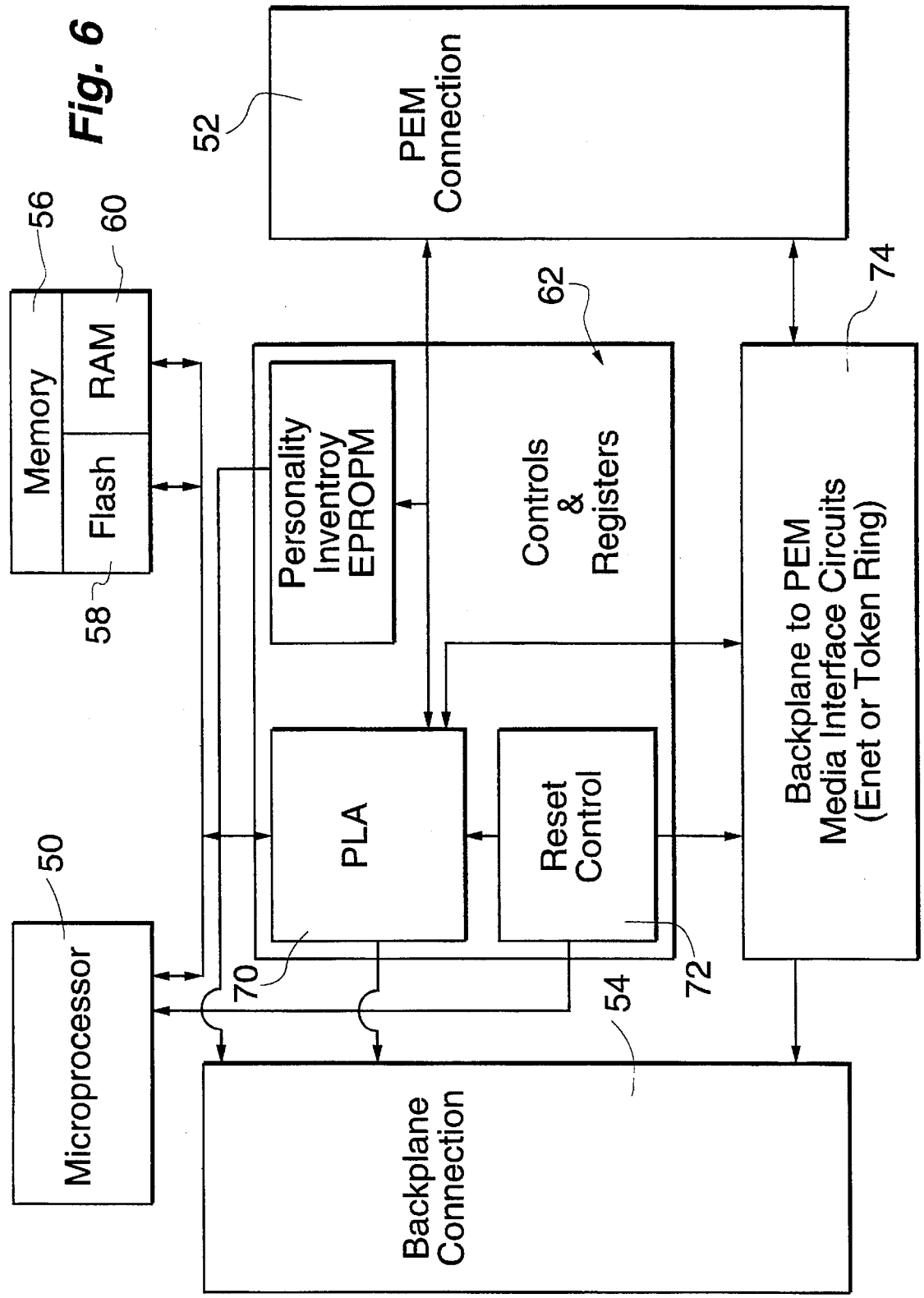
FIG. 6 is a block diagram showing component interconnections according to a preferred layout of a token ring or ETHERNET intelligent interface (carrier).

FIG. 6 shows a preferred arrangement for elements for a token ring or ETHERNET interconnection between a PEM product and a specific backplane of a concentrator (intelligent hub). The carrier module includes a microprocessor (MPU) 50 which may for example be the 68302 processor made by Motorola. The microprocessor 50 is connected to a PEM connector 52 through control logic and MBX 62 52.

The interface provides PEM connector 52 signals with corresponding pin assignments as shown in Table VI.

TABLE VI

| Pin # | Signal | PEM/Carrier Pull Up/Down | Pin # | Signal | PEM/Carrier Pull Up/Down |
|---|---|---|---|---|---|
| | | ETHERNET and Token Ring Connector Pinout Assignment | | | |
| 1 | P12V | | 41 | N12V | |
| 2 | RFU3 | | 42 | GND | |
| 3 | OBX_D(0) | NR/10K PU | 43 | OBX_D(4) | NR/10K PU |
| 4 | OBX_D(1) | NR/10K PU | 44 | OBX_D(5) | NR/10K PU |
| 5 | OBX_D(2) | NR/10K PU | 45 | OBX_D(6) | NR/10K PU |
| 6 | OBX_D(3) | NR/10K PU | 46 | OBX_D(7) | NR/10K PU |
| 7 | OBX_F* | 4.7K PU/NR | 47 | OBX_RD* | NR/10K PU |
| 8 | DBX_F | 4.7K PU/NR | 48 | DBX_WR* | NR/10K PU |
| 9 | GND | | 49 | PEM_PRESENT* | GND/10K PU |
| 10 | STATLED* | 4.7K PU/NR | 50 | PEM_FLED* | 4.7K PU/NR |
| 11 | PEM_RST* (open collector) | 4.7K PU/ 4.7K PU | 51 | PEMRST_REQ* | 10K PU/10K PU |
| 12 | PEM_FRST* | 4.7K PU/NR | 52 | DCID_0 | NR/NR |
| 13 | GND | | 53 | DCID 1 | NR/NR |
| 14 | P1_TXEN/TXLA | NR/10K PD | 54 | RT_P1_RXEN/RX1A | |
| 15 | P1_TXD/TXLB | NR/10K PD | 55 | RT_P1_RXD/RX1B | |
| 16 | RT_P1_COLSN/P1_16_4MHZ | | 56 | GND | |
| 17 | GND | | 57 | RT_P2_COLSN/P2 16 4MHZ | |
| 18 | P2_TXEN/TX2A | NR/10K PD | 58 | RT_P2_RXEN/RX2A | |
| 19 | P2_TXD/TX2B | NR/10K PD | 59 | RT_P2_RXD/RX2B | |
| 20 | GND | | 60 | GND | |
| 21 | PD_TXEN | NR/10K PD | 61 | RT_P3_RXEN | |
| 22 | P3_TXD | NR/10K PDd | 62 | RT_P3_RXD | |
| 23 | RT_P3_COLSN | | 63 | GND | |
| 24 | GND | | 64 | RT_P4_COLSN | |
| 25 | P4_TXEN | NR/10K PD | 65 | RT_P4_RXEN | |
| 26 | P4_TXD | NR/10K PD | 66 | RT_P4_RXD | |
| 27 | GND | | 67 | GND | |
| 28 | RFU1 | | 68 | M*S PEM | NR/10K PU |
| 29 | RFU2 | | 69 | MLAN_COLSN | |
| 30 | MLAN_TXEN | | 70 | MLAN_RXEN | |
| 31 | MLAN_TXD | | 71 | MLANL_RXD | |
| 32 | GND | | 72 | GND | |
| 33 | B_10MHZ* | | 73 | RT 10MHZ_A | |
| 34 | B_20MHZ* | | 74 | PEM XMT | NR/10K PU |
| 35 | E2P5V | | 75 | PEM RCV | |

TABLE VI-continued

ETHERNET and Token Ring Connector Pinout Assignment

| Pin # | Signal | PEM/Carrier Pull Up/Down | Pin # | Signal | PEM/Carrier Pull Up/Down |
|---|---|---|---|---|---|
| 36 | E2DATA | 5.1K to pin 35/NR | 76 | E2CLK | |
| 37 | GND | | 77 | GND | |
| 38 | P4V | | 78 | GND | |
| 39 | P5V | | 79 | P5V | |
| 40 | P4V | | 80 | P5V | |

KEY:
GND = ground
PU = pull up
PD = pull down
NR = no pu/pd resistor

The above connector Pinout assignment is based on the following pin/signal definitions:

B_20 MHZ*: 20 MHz clock signal buffered from the backplane. This clock should only be used for synchronizing ETHERNET signals to the backplane. This clock is present during reset but will NOT be present be during controller switchovers.

B_10 MHZ*: 10 MHz clock signal buffered from the backplane. This clock should only be used for synchronizing ETHERNET signals to the backplane. This clock is present during reset but will NOT be present during controller switchovers.

RT_10 MHZ_A: 10 MHz clock signal synchronized to the 20 MHz clock from the backplane. This clock should only be used for synchronizing ETHERNET signals to the backplane. This clock is NOT present during reset or during controller switchovers.

Pn_TXEN/TXnA:

ETHERNET—Transmit Enable from PEM ETHERNET MAC controller to Carrier. Indicates when a packet is being transmitted out of the PEM on port n, where n is one of four possible ports. This signal must be synchronized to CLK10A both by retiming the signal with a flip/flop, and by driving the ETHERNET MAC with CLK10A directly on TXCLK.

Token Ring—Transmit Data Positive. Positive signal of 802.5 (STP) differential transmit data pair from PEM Token Ring controller to Carrier. Data is transmitted out of port n where n is one of two possible ports.

Pn_TXD/TXnB:

ETHERNET—Transmit Data from PEM ETHERNET MAC controller to Carrier. Data is transmitted out of port n where n is one of four possible ports. This is non-Manchester encoded data. This signal must be synchronized to CLK10A both by retiming the signal with a flip/flop, and by driving the ETHERNET MAC with CLK10A directly on TXCLK.

Token Ring—Transmit Data Negative. Negative signal of 802.5 (STP) differential transmit data pair from PEM Token Ring controller to Carrier. Data is transmitted out of port n where n is one of two possible ports.

RT_Pn_RXEN/RXna:

ETHERNET—Receive Enable from Carrier to PEM ETHERNET MAC controller. Indicates when a packet is being received off the backplane on ETHERNET port n, where n is one of four possible ports. This signal must be synchronized to CLK10A both by retiming the signal with a flop, and by driving the ETHERNET MAC with CLK10A directly on RXCLK.

Token Ring—Received Data Positive. Positive signal of 802.5 (STP) differential receive data pair from Carrier to PEM Token Ring controller. Data is received in from port n where n is one of two possible ports.

RT_Pn_RXD/RXnB:

ETHERNET—Receive Data from Carrier to PEM ETHERNET MAC controller. This is non-Manchester encoded data received off the backplane onto port n, where n is one of four possible ports. This signal must be synchronized to CLK10A both by retiming the signal with a flop, and by driving the ETHERNET MAC with CLK10A directly on RXCLK.

Token Ring—Receive Data Negative. Negative signal of 802.5 (STP) differential receive data pair from Carrier to PEM Token Ring controller. Data is received in from port n where n is one of two possible ports.

RT_Pn_COLSN/Pn_16_4 MHZ:

ETHERNET—Collision Detect signal from Carrier to PEM ETHERNET MAC controller. Indicates when a collision is occurring on the backplane onto port n, where n is one of four possible ports. This signal should also be retimed with CLK10A to assure consistency with the associate signals.

Token Ring—a TTL signal to Carrier from PEM daughter card that indicates what ring speed is being implemented. A high level will indicate 16 MHz and a low level will indicate 4 MHz.

E2DATA: Bi-directional serial data line used to support the XICOR EEPROM device deployed on the PEM Board. The EEPROM is accessed only from the carrier and never from the PEM itself. Note pullup requirement from Table VI above for PEM daughter card.

E2CLK: EEPROM Data CLOCK signal from Carrier to the XICOR EEPROM resident on the PEM daughter card. This signal operates with E2DATA to access the EEPROM, both for reading and writing. All access to the EEPROM is made in serial fashion with these two signals.

E2+5V: Positive 5V poser supply for serial EEPROM ONLY. This signal provides power to the serial EEPROM containing card power information before the module is powered on.

DCID_0, DCID_1: Daughter card identification bits. These bits are statically hard wired signals on the carrier card that indicates which sub slot the PEM daughter card is plugged into. These bits are required for ONcore daughter card EEPROM addressing.

PEM_FLED*: Signal from Carrier to PEM Daughter card to force-active all PEM-residents LEDs. PEM resident LEDs shall remain active for as long as FRCLED* is active. This signal is asynchronous. Note pullup requirement from Table VI above for PEM daughter card.

STATLED*: Signal from Carrier to PEM Daughter card that is hardwired to mandatory green module status LED. Note pullup requirement from Table 3 above for PEM daughter card.

PEM_RST*: Signal from Carrier to PEM daughter card to control PEM reset. When active will force the PEM daughter and expander (if required) card into reset for the duration of PEM_RST* activation. Minimum valid duration is 250 ms. PEM card's must properly reset when given this minimum pulse. No Maximum duration is specified. Note signal is sourced with an open collector device and the pullup requirements from Table VI above for PEM daughter card.

PEMRST_REQ*: Signal from PEM Daughter card to the Carrier indicating when the PEM card incurs a self-generated reset or the push-button reset switch is depressed. This signal acts as a reset request, and does not directly generate the master reset signal. This signal is a pulse with minimum duration of 20 ms. Note pullup requirement from Table VI above for PEM daughter card.

PEM_FRST*: Fast Reset. This signal will be activated by ONcore carriers only during controller module swapping. The signal shall be pulled inactive on all other carrier modules. Note pullup requirement from Table VI above for PEM daughter card.

OBX_D [7:0]: Bi-directional Mailbox Data Bits, interfacing to an ACT based register. This bus is pulled up on Carrier module.

OBX_F*: PEM Mailbox Full. Mailbox status bit from Carrier to PEM. When active, indicates the mailbox from the Carrier to the PEM daughter card is full and waiting to be emptied. Until the PEM reads (empties) the mailbox, the Carrier cannot write any subsequent data to the PEM mailbox. This is the flow control mechanism. Note pullup requirement from Table VI above for PEM daughter card.

DBX_F: Carrier Mailbox Full. Mailbox status bit from PEM to Carrier. When active, indicates the mailbox from the PEM to the Carrier is full and waiting to be read (emptied). Until the Carrier reads (empties) the mailbox, the PEM cannot write any subsequent data to the Carrier mailbox. This is the flow control mechanism. Note pullup requirement from Table VI for PEM daughter card.

OBX1_RD*: Read PEM Mailbox. Control signal from PEM to Carrier that enables the PEM mailbox for reading over the 8-bit Mailbox bus. The rising edge of this signal clears the OBX1_F* flag.

DBX1_WR*: Write Carrier Mailbox. Control signal from PEM to Carrier that latches write data from the PEM card into the Carrier Mailbox on the rising edge of the pulse. Data is written a cross the 8-bit mailbox bus. The rising edge of this signal also sets the DBX1-F flag.

PEM1_XMT: PEM Daughter board Serial Communications Interface Transmit signal. Used to provide communication to the serial management interface. This interface is optional.

PEM1_RCV: PEM Daughter board Serial Communications Interface Receive signal. Used to provide communication to the serial management interface. This interface is optional.

M*S_PEM: This signal allows the PEM Daughter card to become SCI master. Used to provide communication to the serial management interface. This interface is optional.

PEM_PRESENT*: This signal indicates to the Carrier if a PEM daughter card is installed. The PEM daughter card should tie this signal to ground and the Carrier pulls it up. This is used in Chipcom ONcore and ONsemble concentrators (platforms).

MLAN_$_{TXEN}$:

MLAN ETHERNET—Transmit Enable from PEM ETHERNET MAC controller to Carrier's MLAN interface. Indicates when a packet is being transmitted out of the PEM on the MLAN port.

MLAN_TXD:

MLAN ETHERNET—Transmit Data from PEM ETHERNET MAC controller to Carrier's MLAN interface. Data is transmitted out of the PEM's MLAN MAC port. This is non-Manchester encoded data.

MLAN_RXEN:

MLAN ETHERNET—Receive Enable from Carrier's MLAN interface to PEM ETHERNET MLAN MAC controller. Indicates when a packet is being received off the backplane on the MLAN ETHERNET port.

MLAN_RXD:

MLAN ETHERNET—Receive Data from Carrier's MLAN interface to PEM ETHERNET MLAN MAC controller. This is non-Manchester encoded data received off the backplane onto the MLAN port.

MLAN_COLSN:

MLAN ETHERNET—Collision Detect signal from Carrier's MLAN interface to PEM ETHERNET MLAN MAC controller. Indicates when a collision is occurring on the backplane onto the MLAN port.

RFU(1–3): Reserved for Future Use (4 pins).

P5V : Positive 5V power supply signals to PEM card, five total.

P12V: Positive 12V power supply signal to PEM card.

N12V: Negative 12V power supply signal to PEM card.

GND: Power supply ground signals for PEM card, eighteen total.

The invention further allows for the possibility of a direct connection from the PEM to a management system of a hub (concentrator). For example, the concentrator may be provided with a serial bus (SCI bus) for management. Further, management systems can also employ a LAN (local area network) for management. Such a MLAN (for example MLAN used with Chipcom ONcore concentrator) or SCI bus is used to convey status and control information between various entities within the Concentrator's architecture. The following briefly describes the use of the hub management channels provided to 3rd party cards (PEMs).

SCI is fully defined in the ONcore Management Architecture and its use is limited to PEM integrations that require tight management coupling between the Concentrator Management entity and the PEM.

When PEM-XMT* and PEM-RCV* are idle, these signals are pulled to a logic HIGH on the connector.

TABLE VII

SCI Signal Description

| Signal Name | I/O | Signal Type | Assert Level | Description |
|---|---|---|---|---|
| BDMMSO* | I | OCTTL | L | Serial data input |
| BDMMSI* | O | OCTTL | L | Serial data output |

A PEM may also elect to participate in Chipcom's ONcore System MLAN (SMLAN) which is a private ETHERNET LAN. Other hubs may also provide similar management LAN's (MLAN's). The SMLAN private ETHERNET LAN provides a full 10 Mbit of bandwidth and allows the PEM to be very tightly integrated into the Chipcom ONcore Concentrator. Typical uses include the downloading of run time software or for the exchange of RMON statistics.

The protocol used over the SMLAN is CSMA/CD running at 10 MB/sec. It is implemented in the ONcore backplane using two lines, using BTL trapezoidal drivers. These lines are encoded to carry both data and collision information. The SMLAN encoding scheme on the backplane is described below.

TABLE VIII

MLAN Backplane Encoding Scheme

| xMLAN | xMLAN* | Meaning |
|---|---|---|
| 0 | 0 | Collision |
| 0 | 1 | Data = 0 |
| 1 | 0 | Data = 1 |
| 1 | 1 | Idle |

While a PEM transmits onto the SMLAN via the carrier connector, the carrier electronics compare the transmitted data stream with the received data stream on a bit by bit basis. When the carrier electronics detects that a received bit does not match a transmitted bit, the carrier generates a collision signal back to the PEM via the carrier connector indicating that transmission should be halted.

TABLE IX

MLAN Signal Description

| Signal Name | I/O | Signal Type | Assert Level | Description |
|---|---|---|---|---|
| MLAN_TXD | O | CMOS | H | 3rd Party SMLAN serial XMT data, positive polarity. |
| MLAN_TXEN | O | CMOS | H | 3rd Party SMLAN serial XMT data enable, positive polarity. |
| MLAN_RXD | I | CMOS | H | 3rd Party SMLAN serial RCV data, positive polarity. |
| MLAN_RXEN | I | CMOS | H | 3rd Party SMLAN serial RCV data enable, positive polarity. |
| MLAN_COLSN | I | CMOS | H | 3rd Party SMLAN serial RCV collision, polarity. |

The microprocessor 50 is also connected to a backplane connector 54. The backplane connector is connected to a specific backplane such as the concentrator backplane 12 discussed in U.S. Pat. No. 5,301,303. The microprocessor 50 is connected to memory 56 including flash erasable programmable read only memory (EPROM) 58 (such as AMD AM29010—128K×8 or AMD29040—512K×8) and random access memory (RAM) 60 (for example 512K×8). The mailbox protocol software is established in the flash 58 for governing communication between the PEM (via PEM connector 52) on the one hand and communication to the backplane (via backplane connector 54).

Memory 56, microprocessor 50, backplane connector 54 and PEM connector 52 are all connected to the control and register functional element generally designated 62. The control/logic unit 62 includes a programmable logic array (PLA 70). The PLA 70 of the control/logic unit 62 contains both CPU and MPU mailboxes and implements the mailbox status flags. Any of various programmable logic arrays may be used depending on the specific concentrator used. For example, field programmable gate arrays (FPGA) may be used such as Actel A1010B for Chipcom ONline ETHERNET, Actel A1020B for Chipcom ONcore ETHERNET and Actel 1240 for Chipcom ONline token ring. Resets via reset control 72 can be generated on power-up, by the MPU, or the PEM, depending on control bits stored in registers by the MPU. The control/logic unit 62 contains several registers for direct control of the PEM and backplane Ethernet as TR interfaces. These registers control ring speed, backplane/PEM wrap mode, backplane ring selection/connectivity and report status on upstream neighbor present and phantom detect for Token Ring media, and network connections, synchronization, and stat/port identification for Ethernet media.

The token ring and ETHERNET implementations are the same in that the carrier module provides a common interface. However, the backplane to PEM media interface circuits 74 are specific to either ETHERNET or token ring.

The backplane media specific interface circuits 74 on the carrier conditions the 3rd party media interface (PEM) to meet the timing and signal requirements of the particular concentrator backplane. The signal requirements are designed to be the same for all 3rd party cards of the same media type, either ETHERNET or token ring, and these signal requirements are defined by the connector signals (carrier interface circuitry 74). The circuits 74 provide switching capabilities to the backplane wherein the exact switching depends on the specifics of the backplane (see for example the backplane 12 discussed in U.S. Pat. No. 5,301,303). The connection from the PLA 70 to circuits 74 controls enabling on/off, isolation of the module from the backplane, insertion of the module into the backplane and switching connections to the backplane. For token ring, the speed of the ring is controlled and phantom detect is read through the PLA 70 to assert a wire fault whereby the PEM module port is removed from the ring.

In the case of token ring media, the 3rd party must provide standard 802.5 differential transmit and receive signal pairs terminated for STP (Shielded Twisted Pair). The 3rd party must assert phantom in order for the carrier to insert it into the backplane. The 3rd party's token ring implementation should also be able to detect wire faults and respond by removing itself from the ring if detected. A designer may view the interface as a MAU (Media Access Unit) port with a non standard connector. Some concentrators carriers support only one TR MAC interface from the 3rd party's card while other concentrator carriers can support two 3rd party TR MAC interfaces.

The designer of a token ring carrier module must provide the "MAU" port connection on the one side, complete with phantom detect circuits and access/wrap relays. The designer must also provide proper signal conditioning to meet the backplane signals timing, voltage, and current requirements for the specific concentrator implementation.

In the case of ETHERNET media interface, the carrier circuitry converts the (hub manufacturers) proprietary Concentrator synchronous ETHERNET backplane signals into a set of signals that can easily be interfaced with any Media Access Controller (MAC) chip. These signals include: transmit data, receive data, collision detect, receive enable and transmit enable. In addition three clocks that are synchronous to the particular Concentrator backplane are provided to allow synchronization to any other ETHERNET modules that are present in the Concentrator.

Since the PEM interface provides four dedicated ETHERNET channels, a PEM design with up to four MAC chips may be interfaced directly to the particular synchronous Concentrator backplane. These four dedicated ETHERNET channels enter the carrier circuitry and are fed directly into a n synchronous ETHERNET switch crossbar matrix that allows each channel to be separately assigned to one of n Concentrator segments where n is dependent on the Concentrator family. In the case of ONline and ONsemble n=3, in the case of ONcore n=8 with 4 internal loopback segments. The ONcore product provides two PEM connectors such that two PEM modules can be correct.

Once a PEM designs a board that interfaces to the synchronous ETHERNET interface as defined herein, the carrier circuitry will "transparently" convert the PEM signals and connect them to the desired Concentrator backplane network segment independent of the particular concentrator type.

OPERATION

In operation, a PEM or module is made by a party other than the designer of the intelligent hub or concentrator. The PEM is based on the product of the 3rd party. The communication/integration of the PEM into a variety of hubs, is based on the mailbox interface and SW protocol, which is the common component between the varying hubs. The module may be for example a media module, such as for accepting shielded or unshielded twisted pair wires through a RJ type modular jack. The module may be designed for ETHERNET in particular and may have various different manageable characteristics such as the ability to switch between two different networks running on the backplane.

Upon connection of the module 10 to the carrier module or interface 14, the one mandatory sequence events occurs, namely initialization. The echo procedure occurs as noted above. After successful completion of the initialization, the module is assigned to the backplane network interfaces. If no capabilities are supported by the module CPU 18, no further operational interactions will be expected. For example, the module may have no switching capability or other manageable features. However, more complicated capabilities are possible according to the invention. Accordingly, the PEM 10 preferably perceives a personality notification whereby capabilities supported by the PEM CPU 18 are stored in a database or personality table 30. Information may include the administrative state, the speed configuration, network configuration and further data units as described above. After establishing the personality of the PEM modular card 10, specifically the PEM CPU 18, controlled connection to the backplane can commence based on the capabilities of the module 10. For example, the administrative state operations of the network can be transmitted as a one octet field with regard to the network type of a designated port of the module (unspecified, ETHERNET, token ring, FDDI, ATM a synchronous transfer mode), WAN (wide area network) etc. The port connector type may also be established (unspecified, backplane, RJ-unshielded twisted pair, RJ-shielded twisted pair, female AUI, BNC, fiber ST etc.).

While a specific embodiment of the invention has been shown and described in detail to illustrate the application of the principles of the invention, it will be understood that the invention may be embodied otherwise without departing from such principles.

What is claimed is:

1. A module and network backplane interface, comprising:

an intelligent hub with a hub backplane, said backplane selected from the group consisting of a first hub architecture intelligent hub backplane and a second hub architecture intelligent hub backplane, said first hub architecture intelligent hub backplane having a backplane architecture which is either different from a backplane architecture of said second hub architecture intelligent hub backplane or operates using a different protocol, said intelligent hub including network management means with a management processor for generating management signals;

a module selected from the group consisting of a first module type having first module type operating parameters and a second module type having second module type operating parameters, said second module type operating parameters being different from said first module type operating parameters, said module including a central processing unit for generating parameter signals;

a backplane interface connector connected to said intelligent hub and connected to said module;

control means for controlling passage of parameter signals from said module to said intelligent hub and for controlling passage of management signals from said intelligent hub to said module: and mailbox information exchange means for reading information from said control means and writing information to said module and for reading information from said module and writing information to said control means, said module including a module central processing unit and said mailbox information exchange means including. a management processing unit, a management processing unit mailbox, a module processing unit mailbox, flag means associated with said management processing unit mailbox for indicating said management processing unit mailbox is full and flag means associated with said module processing unit mailbox for indicating said module processing unit mailbox is full, said module processing unit writing to said management processing unit mailbox and reading from said module processing unit mailbox, said management processing unit reading from said management processing unit mailbox and writing to said module processing unit mailbox, said module processing unit generating data units after connection to said interface means, said data units being transferred to said management processing unit for establishing a personality table, said data units establishing management of said module for connection with said backplane, wherein said management processing unit and said module processing unit transfer said information signals based on a mailbox data unit transmission procedure comprising:

(1) checking the mailbox to which the data units are to be transmitted to see if it is empty;

(2) placing a next data unit octet into the mailbox checked and setting said flag means; and repeating steps 1 and 2 until all data unit octets have been transmitted, data unit reception including the steps of:

checking one of said mailboxes to make sure that it is full;

reading a next data unit octet from the mailbox checked wherein a first octet of a data unit is used for length indication; and repeating steps 1 and 2 until all data unit octets have been received.

2. A module and network backplane interface according to claim 1, further comprising:

backplane to module media interface circuit means for transferring data packets between said module and said backplane.

3. A module and network backplane interface according to claim 1, wherein said module includes a module central processing unit and said interface means includes a management processing unit, a management processing unit mailbox and a module processing unit mailbox, said module processing unit writing to said management processing unit mailbox and reading from said module processing unit mailbox, said management processing unit reading from said management processing unit mailbox and writing to said module processing unit mailbox.

4. A module and network backplane interface according to claim 3, further comprising flag means associated with said management processing unit mailbox for indicating said management processing unit mailbox is full and flag means associated with said module processing unit mailbox for indicating said module processing unit mailbox is full.

5. A module and network back plane interface according to claim 3, wherein said module processing unit generates data units after connection to said interface means, said data units being transferred to said management processing unit for establishing said personality table, said data units establishing management of said module for connection with said backplane.

6. A local area network backplane interface, comprising:

a concentrator backplane operating one or more local area access methods;

a module for connection to said backplane for providing a local area network function, said module generating operating parameter signals;

common interface means for establishing a connection between said module and said backplane, including control means for exchanging information between said module and said interface means with a first mailbox for reading information signals including operating parameters from said module and writing information signals to said interface means and a second mailbox for reading information from said interface means and writing information to said mailbox;

parameter table means for listing operating parameters of said module, received as information signals, said operating parameters for determining management of said module for connection of said module to said backplane;

backplane to module media interface circuit means for transferring data packets between said module and said backplane; and network management means for managing said concentrator backplane including managing connections to said concentrator backplane, said network management means for configuring one or more networks on said backplane and managing said module, based on management attributes established in said parameter table.

7. A local area network backplane interface according to claim 6, wherein said concentrator is a generic concentrator operating one or more local area network, each local area network based on a local area network access method.

8. A local area network backplane interface according to claim 6, wherein said management includes switching said module between two different local area networks configured on said backplane.

9. A local area network according to claim 6, wherein said module includes a module central processing unit and said interface means includes a management processing unit, a management processing unit mailbox and a module processing unit mailbox, said module processing unit writing to said management processing unit mailbox and reading from said module processing unit mailbox, said management processing unit reading from said management processing unit mailbox and writing to said module processing unit mailbox.

10. A local area network backplane interface according to claim 9, wherein said management processing unit and said module processing unit transfer said information signals based on a mailbox data unit transmission procedure comprising:

(1) checking the mailbox to which the data units are to be transmitted to see if it is empty;

(2) placing a next data unit octet into the mailbox checked and setting said flag means; and repeating steps 1 and 2 until all data unit octets have been transmitted, data unit reception including the steps of:

checking one of said mailboxes to make sure that it is full;

reading a next data unit octet from the mailbox checked wherein a first octet of a data unit is used for length indication; and repeating steps 1 and 2 until all data unit octets have been received.

11. A local area network according to claim 9, further comprising flag means associated with said management processing unit mailbox for indicating said management processing unit mailbox is full and flag means associated with said module processing unit mailbox for indicating said module processing unit mailbox is full.

12. A method for establishing a connection between a local area network backplane and a module, the module having a module central processing unit and said backplane having all interface with a management processing unit, a management processing unit mailbox and a module processing unit mailbox and having a management processing unit mailbox flag and a module processing unit mailbox flag, the method comprising the steps of:

(1) initializing communication between said management processing unit and said module central processing unit, comprising the steps of:

initializing communication between said management processing unit and said module central processing unit;

transferring module operating parameter information to the management processing unit;

storing the module operating parameter information transferred to memory; and using the information to control a connection of the module to the backplane and to control the module during a transfer of data packets between the backplane and the module wherein said step of initializing communication including transmission which comprising the steps of:

(1) checking an associated mailbox to determine if the mailbox is empty;

(2) placing a next data unit octet into said mailbox and setting the flag;

(3) repeating steps 1 and 2 until all data unit octets have been transmitted and reception which comprises the steps of:

(1) checking a mailbox associated with the processing unit to which the transmission is to be sent to determine if it is full or empty;

(2) reading the next data unit octet from the inbox, if the next octet is a first octet of a data unit, the octet is used as a length indication; and (3) repeating steps 1 and 2 until all data unit octets have been received.

13. A method according to claim 12, wherein connection of said module to the backplane is managed by a network management unit associated with the hub.

14. A method according to claim 12, further comprising transferring data packets between said module and said backplane via a media interface circuit.

15. A method according to claim 12, wherein said data units transmitted from said module processing unit to said management processing unit include information as to module operation characteristics for managing connection of said module to said backplane.

16. A method according to claim 15, wherein said interface includes a parameter table established and accessed by said master processing unit, said management processing unit writing operational characteristics of said module to said parameter table for managing connection of said module to said backplane.

* * * * *